United States Patent [19]
Edens

[11] Patent Number: 5,944,990
[45] Date of Patent: Aug. 31, 1999

[54] FLUID FILTER APPARATUS

[76] Inventor: Jeffrey I. Edens, 16192 Bimini, Huntington Beach, Calif. 92649

[21] Appl. No.: 07/983,122

[22] Filed: Nov. 30, 1992

[51] Int. Cl.$^6$ .............................. B01D 29/00; B01D 29/39
[52] U.S. Cl. ....................... 210/232; 210/323.2; 210/443; 210/450; 210/456
[58] Field of Search .................................... 210/232, 238, 210/323.2, 443, 450, 456

[56] References Cited

U.S. PATENT DOCUMENTS

| | | | |
|---|---|---|---|
| 4,402,828 | 9/1983 | Edens | 210/323.2 |
| 4,923,601 | 5/1990 | Drari | 210/232 |
| 5,026,478 | 6/1991 | Tanabe et al. | 210/232 |
| 5,028,323 | 7/1991 | Gowen | 210/232 |
| 5,092,993 | 3/1992 | Goodwin | 210/232 |

*Primary Examiner*—John Kim
*Attorney, Agent, or Firm*—Boniard I. Brown

[57] ABSTRACT

A fluid filter has separable upper and lower housing portions releasably joined in assembled relation wherein the lower housing portion closes the open lower end of the upper housing portion to form a fluid inlet chamber in the upper portion communicating with an unfiltered fluid inlet in the lower portion, and removable filter cartridges mounted on the upper end of the lower housing portion within the fluid inlet chamber in the upper portion and internally communicating with a filtered fluid outlet in the lower portion. The upper housing portion is separable from the lower housing portion to uncover the full lengths of the filter cartridges in a manner which facilitates periodic removal and replacement of the cartridges for cleaning or replacement of damaged cartridges and permits close inspection of the sealed ends of the cartridges to assure proper sealing of replaced cartridges to the lower housing portion prior to reassembly of the housing portions.

12 Claims, 3 Drawing Sheets

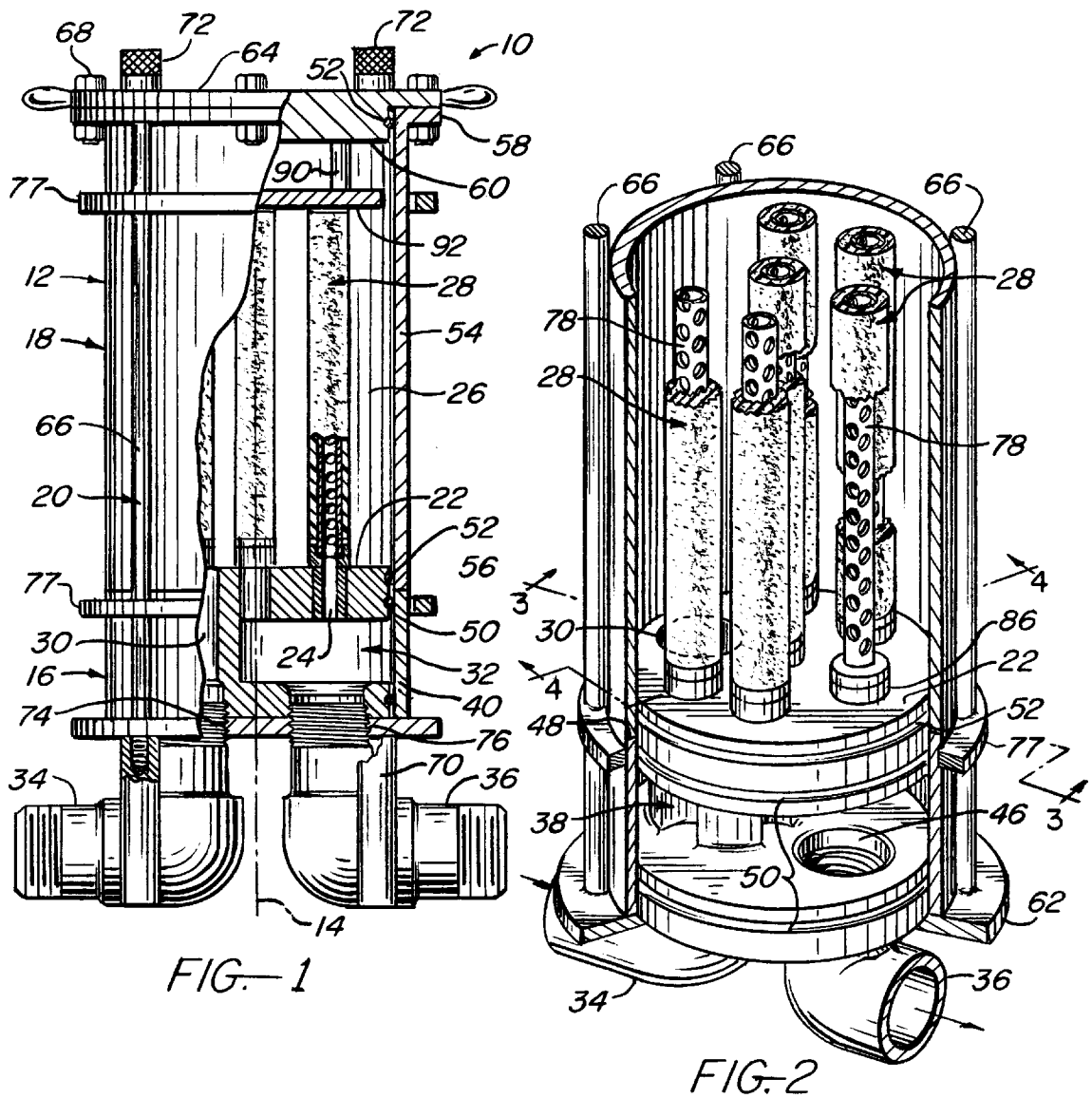
FIG.-1
FIG.-2
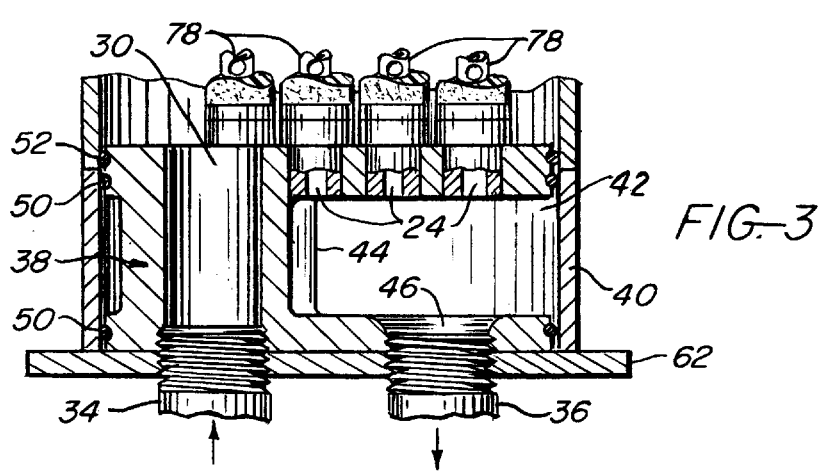
FIG.-3

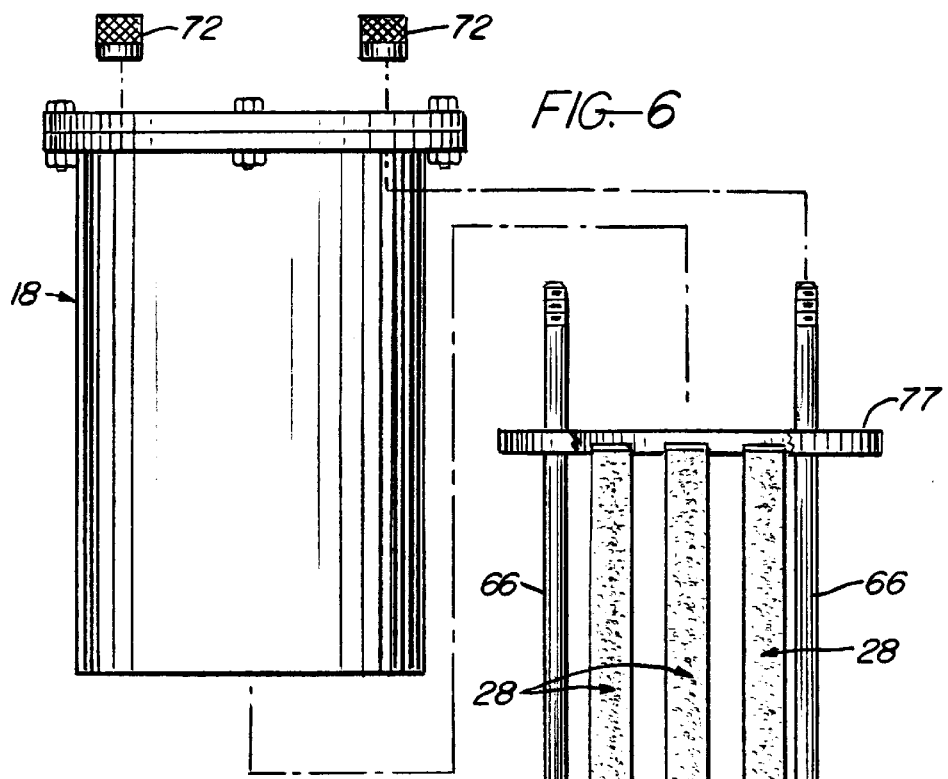
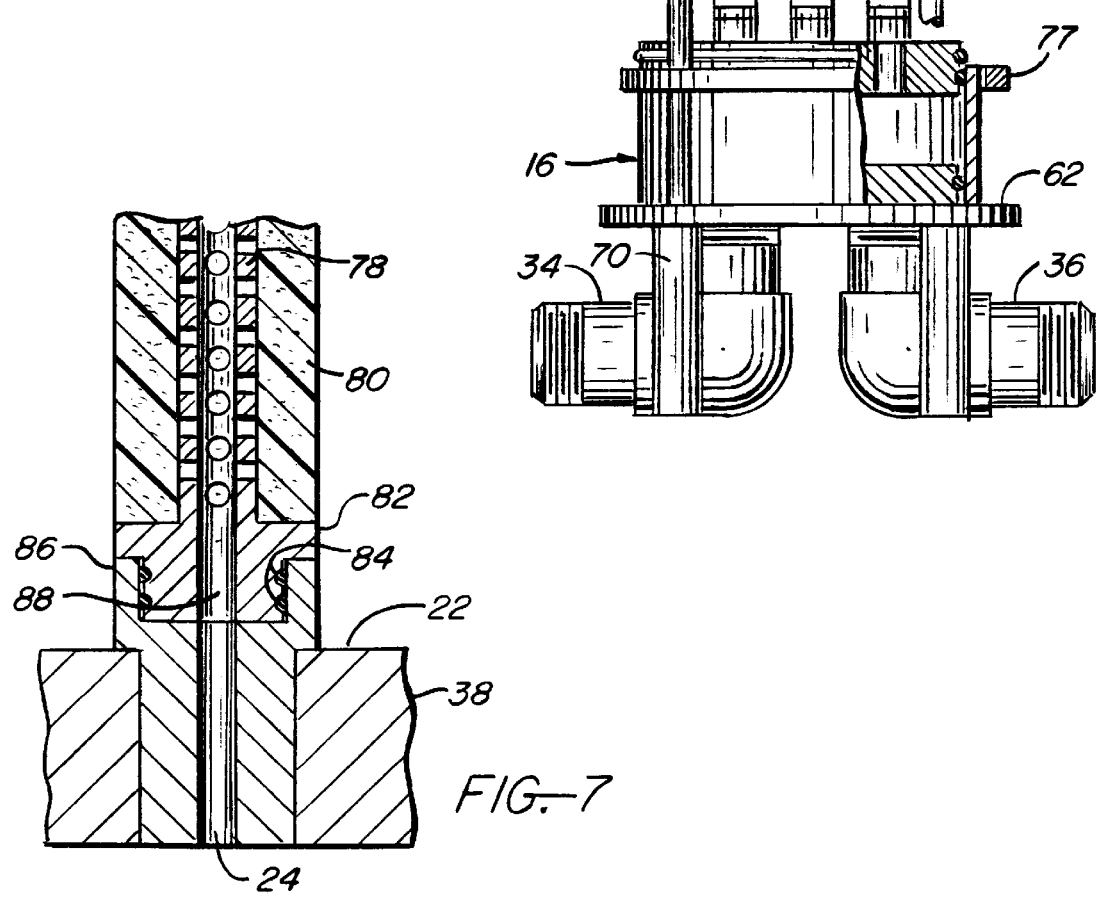

FLUID FILTER APPARATUS

BACKGROUND OF THE INVENTION

1. Field of the Invention

This invention relates generally to the fluid handling art and more particularly to an improved fluid filter.

2. Prior Art

The filter of this invention is an improvement on the filter described in my earlier U.S. Pat. No. 4,202,828. The filter described in that patent is particularly designed for high pressure fluid handling applications and embodies certain unique features of construction which enable the filter to handle relatively high pressure fluid without rupturing or leaking. Simply stated, the filter described in the patent has a housing which forms a pressure vessel and includes a tubular shell-like body having open normally upper and lower ends, removable upper and lower end caps closing the upper and lower ends of the body, tie rods joining the end caps with the end caps seating firmly against and sealed to the ends of the body, and a flow block immediately adjacent the lower end cap and removably positioned within and circumferentially sealed to the lower end of the tubular body. The interior of the tubular body above the lower flow block forms an inlet fluid chamber.

The flow block has an upper end face which forms the bottom wall of the chamber. Entering this upper end face of the flow block are a number of apertures in which are removably fixed the lower base ends of relatively long, slender, and generally tubular filter cartridges that extend upwardly from the flow block through the inlet chamber. Extending through the flow block and the lower end cap is a fluid inlet passage which opens at one end upwardly through the upper end face of the flow block into the inlet chamber and a fluid outlet passage that opens at one end through the flow block apertures into the interiors of the filter cartridges. The opposite ends of these inlet and outlet passages open to the exterior of the housing through inlet and outlet couplings, respectively.

The filter is installed in a fluid handling system with the filter inlet coupling connected to a fluid supply line for conducting unfiltered fluid to the filter and with the filter outlet coupling connected to a fluid outlet line for conducting filtered fluid from the filter. During operation of the filter, fluid to be filtered flows from the fluid supply line through the inlet passage in the filter flow block into the filter inlet chamber and then through the individual filter cartridges into the interiors of these cartridges. The fluid is filtered as it passes through the cartridges, and the resulting filtered fluid flows longitudinally through the interiors of the cartridges to the outlet passage in the flow block and then through this outlet passage to the outlet fluid line.

Maintenance of the filter in proper operating condition requires periodic removal of the filter cartridges for cleaning and replacement of any damaged cartridges. Removal and replacement of the filter cartridges is accomplished by removing nuts threaded on the upper ends of the tie rods which join the upper and lower end caps of the filter housing and then removing the upper end cap from the tubular body of the filter housing. The lower end cap and flow block remain firmly fixed in position by the fluid supply and outlet pipes to which the filter is connected, and the tubular body of the filter remains in position on the fixed lower end cap and flow block. Removal of the upper end cap uncovers the upper end opening of the tubular body for inspection, removal, and replacement through such upper end opening.

SUMMARY OF THE INVENTION

This invention provides improvements in my above described patented filter which facilitate removal and replacement of the filter cartridges and permits close inspection of the base ends of the replaced cartridges before closing of the filter housing to assure proper sealing of the cartridges to the flow block before the filter is reassembled and placed into operation. The improved filter of this invention has a housing including an upper housing portion having a normally closed upper end and an open lower end, a lower housing portion having upper and lower ends and an upper end face, and connecting means releasably joining these housing portions in assembled relation wherein the upper end of the lower housing portion closes the lower end of the upper housing portion to form within the upper portion a fluid inlet chamber closed at its lower end by the upper end of the lower housing portion.

Extending upwardly from the lower housing portion through the inlet chamber in the upper housing portion is at least one relatively long and slender filter cartridge having a lower base end removably fixed within an aperture in the upper end face of the lower portion. The lower housing portion contains a fluid inlet passage which opens at one end upwardly to the fluid inlet chamber and a fluid outlet passage which opens at one end to each aperture in the upper end face of the lower housing portion. The other end of the inlet passage opens to the exterior of the filter housing for connection to an unfiltered fluid supply line. The other end of this outlet passage opens to the exterior of the housing for connection to a fluid line for conducting filtered fluid from the filter. Unfiltered fluid arriving through the supply line enters the filter inlet chamber through the fluid inlet passage, passes into each filter cartridge, and then flows through the cartridge to the filter outlet passage. About base end of each filter cartridge is a seal for sealing the cartridge to the lower housing portion.

The arrangement of the filter is such that when the connecting means joining the upper and lower housing portions is released, the upper housing portion is removable upwardly from the lower housing portion in such a way as to fully uncover each filter cartridge for easy removal and replacement and for very close inspection of the base of each replaced cartridge to assure proper sealing of the replaced cartridge to the lower housing portion before reassembly of the upper housing portion on the lower portion.

In the preferred filter embodiment described herein, the upper filter housing portion includes a tubular body open at its lower end. The lower housing portion includes a flow block containing the filter inlet and outlet passages and mounting the filter cartridge(s), and a surrounding sleeve which closes the radially outer side of a circumferential manifold cavity in the block which forms part of the outlet passage. The upper end of this sleeve is located below the upper end face of the flow block. The connecting means which join the housing portions includes an upper end cap seating against the upper end of the tubular housing body, a lower end cap at the bottom of the flow block, and tie rods releasably joining the end caps. When the upper and lower housing portions are joined in assembled relation, the lower end of the upper tubular body surrounds and is sealed to the upper end of the lower housing flow block and abuts the upper end of the lower housing sleeve so that removal of the tubular body uncovers the full length of each filter cartridge for easy removal and replacement of the cartridge and close inspection of its mounting base.

BRIEF DESCRIPTION OF THE DRAWINGS

FIG. 1 is a side elevation, partly broken away, of an assembled, improved fluid filter according to this invention;

FIG. 2 is an enlarged fragmentary perspective view in section of the lower end of the filter of FIG. 1;

FIG. 3 is an enlarged section taken on line 3—3 in FIG. 2;

FIG. 6 is a view similar to FIG. 1 showing the manner in which the filter is disassembled or opened to permit inspection, removal, and replacement of the filter cartridges; and FIG. 7 is an enlargement, in cross-section, of the area encircled by the arrow 7—7 in FIG. 6.

DESCRIPTION OF THE PREFERRED EMBODIMENT

Figure 4:
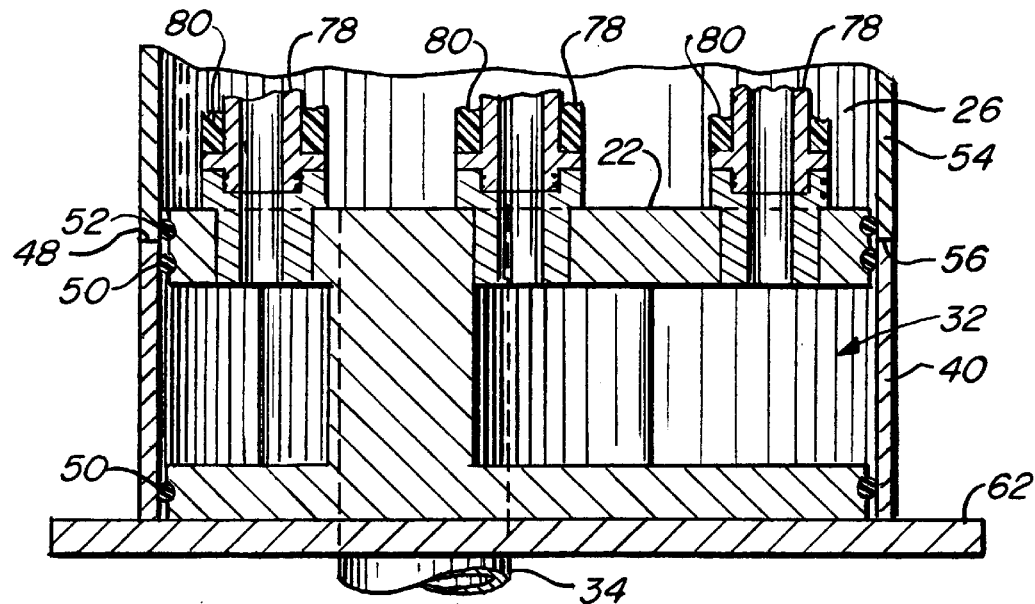
FIG. 4 is an enlarged section taken on line 4—4 in FIG. 2.
Figure 5:
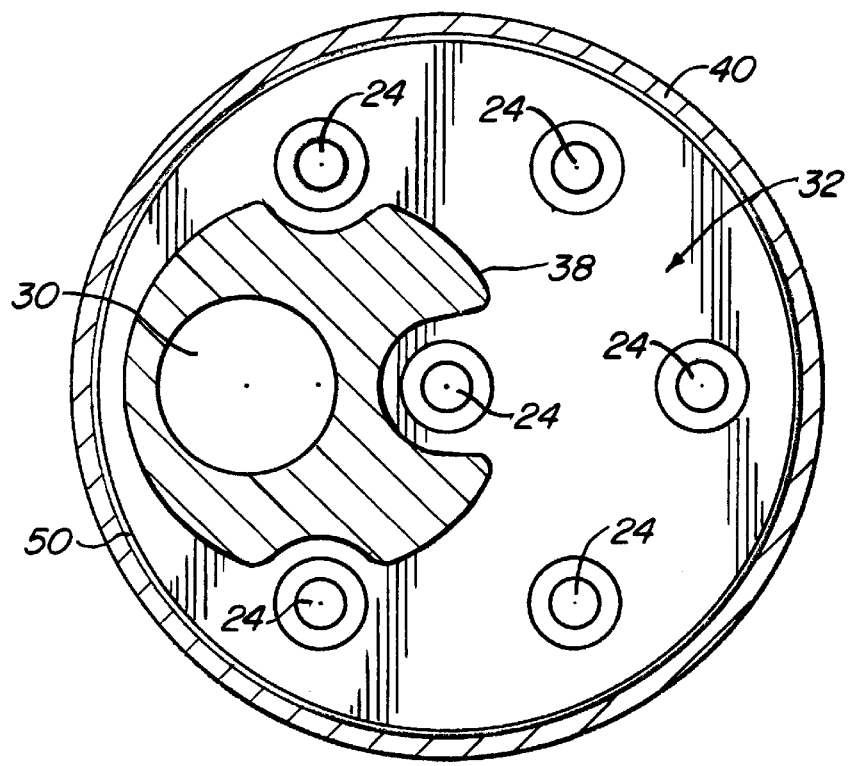
FIG. 5 is a section taken on line 5—5 in FIG. 3.

Turning now to these drawings, the improved fluid filter 10 of the invention comprises a housing 12 having a pressure vessel construction capable of withstanding relatively high fluid pressures. The housing has a longitudinal axis 14 and includes lower and upper housing portions 16, 18 each having upper and lower ends, and connecting means 20 releasably joining these housing portions in their axially assembled relation illustrated in FIG. 1. The lower housing portion 16 has an upper end face 22 and apertures 24 entering the face. The upper housing portion 18 has a generally tubular shape, a closed upper end, and an open lower end. When joined in their assembled relation of FIG. 1, the open lower end of the upper housing portion 18 is disposed in fluid sealing relation to and closed by the upper end of the lower housing portion 16. The housing portions then form within the upper portion a closed fluid inlet chamber 26 having side and upper end walls formed by the tubular upper housing portion and a bottom wall formed by the upper end face 22 of the lower housing portion.

Mounted on and extending upwardly from the upper end of the lower housing portion 16 are a number of relatively long, slender, and generally tubular filter cartridges 28. Each cartridge has a lower base end removably fixed within one of the apertures 24 in the lower housing portion and extends upwardly through inlet chamber 26. Each cartridge is porous to fluid flow from the inlet chamber 26 to the interior of the cartridge and filters particulates and possibly other foreign elements from the fluid.

The lower housing portion 16 contains a fluid inlet passage 30 opening at one end to the inlet chamber 26 and a fluid outlet passage 32 opening at one end to each of the apertures 24 in the lower housing portion 16. The other end of the inlet passage 30 opens to the exterior of the filter housing 12 through an inlet coupling 34. The other end of the outlet passage 32 opens to the exterior of the filter housing through an outlet coupling 36.

In use of the filter 10, the inlet coupling 34 is connected to a fluid supply line which conducts unfiltered fluid to the filter. The outlet coupling 36 is connected to a fluid discharge line which conducts filtered fluid from the filter. During operation of the filter, incoming unfiltered fluid arriving through the fluid supply line flows through the inlet passage 30 into the inlet chamber 26 and then passes radially inward through the porous sides of the filter cartridges 28 which filter particulates and other forein elements from the fluid. The resulting filtered fluid flows downwardly through the filter cartridges to the outlet passage 32 and through this passage to the outlet fluid line.

As will be explained in greater detail later, an important and unique feature of the invention resides in the fact the upper housing portion 18 is separable from said lower housing portion 16 upwardly along the axis 14 in such a way that each filter cartridge 28 and the upper end face 22 of the lower housing portion are totally uncovered both along the axis 14 and laterally of the axis throughout a full 360 degrees about the axis, without obstruction by the upper housing portion. Totally uncovering the filter cartridges in this way greatly facilite removal and replacement of any or all cartridges and permits very close inspection of the lower sealed end of each replaced cartridge to assure proper sealing of the cartridges to the lower housing portion prior to reassembly of the upper housing portion on the lower housing portion.

Referring now in more detail to the drawings, the lower housing portion 16 includes a generally cylindrical flow block 38. Slidably fitted over this flow block is a sleeve 40 whose axial dimension is somewhat shorter than the axial dimension of the flow block. The upper end face of the flow block constitutes the upper end face 22 of the lower housing portion 16 and contains the apertures 24. Radially entering the circumference of the flow block 38 between its upper and lower ends is a manifold cavity 42 which extends circumferentially about a generally cylindrical mid-portion 44 of the block and opens upwardly to the apertures 24. The flow block has a reduced cylindrical mid-portion 44 which is eccentrically situated adjacent the circumference of the block and contains the inlet passage 30. Extending downwardly from the manifold cavity 42 through the lower face of the flow block is an opening 46. The apertures 24, manifold cavity 42, and opening 46 together form the outlet passage 32 through the flow block.

The flow block 38 and sleeve 40 are fabricated separately and then assembled to form the lower housing portion 16. When assembled on the flow block, the lower end of the sleeve is flush with the lower end of the block, and the upper end of the flow block projects a small distance above the upper end 48 of the sleeve because of the longer axial dimension of the flow block compared to that of the sleeve. Seal rings 50 seal the flow block to the sleeve above and below the flow block cavity 42 so that the sleeve closes the open, radially outer side of the cavity. Surrounding the upper end of the flow block 38 above the upper sleeve end 48 is a seal ring 52.

The upper tubular housing portion 18 includes a sleeve 54 having an open lower end 56 and an outwardly directed flange 58 about its upper end. Positioned within and closing the upper end of the sleeve 54 is an end wall 60. A seal ring 62 seals this end wall to the sleeve. The sleeve 54 has the same diameter as the sleeve 40 of the lower housing portion 16. The housing portions 16, 18 are normally disposed in their assembled relation of FIG. 1 wherein the lower end of the upper housing sleeve 54 fits over the upper projecting end of the lower flow block 38, and the lower end edge 56 of the sleeve abuts the upper end edge 48 of the lower housing sleeve 40. In this assembled relation, the upper end of the flow block 38 is disposed within and closes the lower open end of the upper housing sleeve 56 and is sealed to the latter sleeve by the seal ring 52 on the flow block.

The connecting means 20 which join the lower and upper housing portions 16, 18 in their assembled relation comprise disc-shaped lower and upper end caps 62, 64 and tie rods 66 joining the end caps. The end caps have a diameter somewhat greater than the diameter of the housing sleeves 40, 54. The lower end cap 62 seats against and projects radially outward beyond the lower end of the lower housing sleeve 40. The flow block 38 abuts and may be secured to the lower end cap. The upper end cap 64 has the same outer diameter as and seats against the flange 58 on the upper housing sleeve 54 and is secured to the flange by bolts 68. The end wall 60 in the upper end of the upper housing sleeve is secured to the upper end cap. The tie rods 66 are located externally of and circumferentially spaced about the housing 12. The lower ends of the tie rods are threaded in the radially outer circumferential portion of and project a distance below the lower end cap 62. Threaded on the lower ends of the tie rods are legs 70 for supporting the filter on a horizontal surface. The tie rods have upper threaded ends which extend loosely through holes in the upper sleeve flang 58 and upper end cap 64. Threaded on the upper ends of the tie rods above the upper end cap are nuts 72 which may be tightened to draw the end caps 62, 64 toward one another into firm clamping contact with the lower and upper ends of the housing sleeves 40, 54 and thereby urge the ends 48, 56 of the sleeves into firm abutting contact.

The lower end cap 62 has holes 74. 76 aligned with the inlet passage 30 and outlet passage 32, respectively, in the lower flow block 38. The inlet and outlet couplings 34, 36 have upper ends which extend through these lower end cap holes and are threaded in the lower ends of the inlet and outlet passages, respectively, as shown.

From the description to this point, it is evident that the upper housing portion 18 may be removed upwardly from the lower housing portion 16 by removing the nuts 72 from the tie rods 20 and raising the upper portion from the tie rods. The housing portions may be reassembled by reversing this procedure. When the housing portions are assembled, the upper end of the lower flow block 38 fits within and is sealed to the open lower end of the upper body sleeve 54 to form the inlet chamber 26 in the upper body portion. The inlet passage 30 opens upwardly through the upper flow block face 22 into this chamber. Disassembly and reassembly of the housing is aided by alignment rings 77 welded to the tie rods 66. These rings are internally sized to fit relatively closely about the housing sleeves 40, 54, between their ends so as to retain the sleeves in coaxial alignment during dis-assembly and reassembly of the housing portions.

The filter cartridges 28 are identical. Each cartridge has a tubular construction including an inner perforated tube 78 and a porous filter sleeve 80 surrounding the tube. The lower end of the tube 78 is enlarged to form a coupling end 82 surrounded by seal rings 84. This coupling end fits removably within and is sealed by the seal rings 84 to a coupling socket 86 fixed within a flow block aperture 24. The cartridge tube 78 contains a central fluid passage 88 which extends downwardly through the coupling socket 86 to the flow block manifold cavity 20. Suspended by legs 90 from the underside of the upper housing end wall 60 is a clamp plate 92 which presses downwardly against the upper ends of the filter filter cartridges 28 when the filter housing 12 is assembled to hold the cartridges firmly in their coupling sockets 86.

The filter is installed in a fluid handling system having an unfiltered fluid supply line which is connected to the filter inlet coupling 34 and a filtered fluid outlet line which is connected to the filter outlet coupling 36. Unfiltered fluid flow occurs through the flow block inlet passage 30 into the inlet chamber 26 and then into the filter cartridges. The fluid is filtered as it passes through the outer filter sleeves 80 of the cartridges, and the filter fluid flows downwardly through the cartridges to the filter outlet passage 32.

The improved filter of the invention possesses the unique advangtage that upward removal of the upper housing portion 18 from the lower housing portion 16 uncovers the full length of the filter cartridges 28 and the upper end of the flow block 38. This greatly facilitates periodic removal and replacement of the cartridges for cleaning or replacement of damaged cartridges. Moreover, uncovering of the cartridges and upper end of the flow block in this way permits close inspection of the base ends of the filter cartridges to assure that they are properly sealed to the flow block before the filter housing is reassembled.

I claim:

1. A fluid filter comprising:

a housing having a longitudinal axis and including a lower housing portion having upper and lower ends, an upper end face, and at least one aperture entering said face; an upper housing portion disposed in assembled relation with said lower housing portion and having a normally closed upper end, and an open lower end disposed in fluid sealing relation to the upper end of said lower housing portion wherein said upper end of said lower housing portion closes the lower open end of said upper housing portion; and connecting means releasably joining said housing portions in said assembled relation wherein said housing portions form a fluid inlet chamber within said upper housing portion above said lower housing portion;

an elongate porous filter cartridge having a lower base end removably fixed within each of said apertures in said lower housing portion and extending axially through said inlet chamber for fluid flow from said inlet chamber into each cartridge; and wherein said lower housing portion includes a fluid inlet passage opening at one end to said inlet chamber and at the other end to the exterior of said housing, and a fluid outlet passage opening at one end to the interior of each filter cartridge through the respective aperture in said lower housing portion and at the other end to the exterior of said housing;

said upper housing portion is separable from said lower housing portion along said axis so that each said filter cartridge and said upper end face of said lower housing portion are totally uncovered without obstruction by said upper housing portion when said upper housing portion is separated from said lower housing portion to facilite removal and replacement of each filter cartridge and close inspection of the lower sealed end of each replaced cartridge prior to reassembly of said upper housing portion on said lower housing portion;

said inlet and outlet passages are isolated from the exterior of said lower housing portion between said passage ends when said housing portions are assembled as well as when said housing portions are separated;

said lower housing portion comprises a cylindrical flow block having upper and a lower ends and said upper end face at said upper end of said flow block;

said flow block contains said inlet passage and a radially outwardly opening manifold cavity between the flow block ends which opens to each said aperture and forms a part of said outlet passage; and said lower housing portion includes a sleeve circumferentially surrounding said flow block in fluid sealing relation to said block at opposite sides of said cavity and closing the open radially outer side of said cavity.

2. A filter according to claim 1 wherein:

said upper housing portion has a lower downwardly facing annular edge extending about the lower open end of said upper portion in a plane transverse to said axis;

said sleeve has an upper, normally upwardly facing annular end edge in a plane transverse to said axis and located between said upper end face and the lower end of said flow block; and said lower end of said upper housing portion receives and is sealed to the upper end of said flow block above said sleeve edge and said annular edges abut one another when said housing portions are disposed in assembled relation.

3. A filter according to claim 2 wherein:

said upper housing portion comprises a sleeve having a lower open end and said annular edge of said upper housing portion about said lower open sleeve end;

said lower open end of said upper housing portion sleeve receives said upper end of said flow block when said housing portions are disposed in assembled relation, and an upper end wall closing the upper end of said sleeve; and the upper end of said flow block has a seal ring sealing the lower end of said upper housing sleeve to said flow block when said housing portions are disposed in assembled relation.

4. A filter according to claim 3 wherein:

said connecting means comprise an upper end cap seating against the upper end of said upper housing portion sleeve, a lower end cap seating against the lower end of said lower housing portion sleeve, tie rods circumferentially spaced about joined to said housing and having lower ends secured to said lower end cap and upper threaded ends extending loosely through said upper end cap, and nuts threaded on said upper tie rod ends above said upper end cap.

5. A filter according to claim 4 wherein:

said lower housing part includes an upwardly opening coupling socket in each said aperture removably receiving the base end of the respective filter cartridge; and said upper housing portion includes clamp means at the upper end of said inlet chamber engaging the upper end of each filter cartridge to retain the cartridge in its respective coupling socket when said housing portions are disposed in assembled relation.

6. A filter according to claim 1 wherein:

said lower housing part includes an upwardly opening coupling socket in each said aperture removably receiving the base end of the respective filter cartridge; and said upper housing portion includes clamp means at the upper end of said inlet chamber engaging the upper end of each filter cartridge to retain the cartridge in its respective coupling socket when said housing portions are disposed in assembled relation.

7. A fluid filter housing comprising:

a lower housing portion having upper and lower ends, an upper end face, and at least one aperture entering said face for removably receiving a filter cartridge;

an upper housing portion disposed in assembled relation with said lower housing portion and having a normally closed upper end, and an open lower end disposed in fluid sealing relation to the upper end of said lower housing portion wherein said upper end of said lower housing portion closes the lower open end of said upper housing portion;

connecting means releasably joining said housing portions in said assembled relation wherein said housing portions form a fluid inlet chamber within said upper housing portion above said lower housing portion; and wherein said lower housing portion includes a fluid inlet passage opening at one end to said inlet chamber and at the other end to the exterior of said housing, and a fluid outlet passage opening at one end to each aperture in said lower housing portion and at the other end to the exterior of said housing;

said upper housing portion is separable from said lower housing portion along said axis so that each filter cartridge mounted in the housing and said upper end face of said lower housing portion are totally uncovered without obstruction by said upper housing portion when said upper housing portion is separated from said lower housing portion to facilite removal and replacement of each filter cartridge and close inspection of the lower sealed end of each replaced cartridge prior to reassembly of said upper housing portion on said lower housing portion;

said inlet and outlet passages are isolated from the exterior of said lower housing portion between said passage ends when said housing portions are assembled as well as when said housing portions are separated;

said lower housing portion comprises a cylindrical flow block having upper and a lower ends and said upper end face at said upper end of said flow block;

said flow block contains said inlet passage and a radially outwardly opening manifold cavity between the flow block ends which opens to each said aperture and forms a part of said outlet passage; and said lower housing portion includes a sleeve circumferentially surrounding said flow block in fluid sealing relation to said block at opposite sides of said cavity and closing the open radially outer side of said cavity.

8. A filter housing according to claim 7 wherein:

said upper housing portion has a lower downwardly facing annular edge extending about the lower open end of said upper portion in a plane transverse to said axis;

said sleeve has an upper, normally upwardly facing annular end edge in a plane transverse to said axis and located between said upper end face and the lower end of said flow block; and said lower end of said upper housing portion receives and is sealed to the upper end of said flow block above said sleeve edge and said annular edges abut one another when said housing portions are disposed in assembled relation.

9. A filter housing according to claim 8 wherein:

said upper housing portion comprises a sleeve having a lower open end and said annular edge of said upper housing portion about said lower open sleeve end;

said lower open end of said upper housing portion sleeve receives said upper end of said flow block when said housing portions are disposed in assembled relation, and an upper end wall closing the upper end of said sleeve; and the upper end of said flow block has a seal ring sealing the lower end of said upper housing sleeve to said flow block when said housing portions are disposed in assembled relation.

10. A filter housing according to claim 9 wherein:

said connecting means comprise an upper end cap seating against the upper end of said upper housing portion sleeve, a lower end cap seating against the lower end of said lower housing portion sleeve, tie rods circumferentially spaced about and joined to said housing and having lower ends secured to said lower end cap and upper threaded ends extending loosely through said upper end cap, and nuts threaded on said upper tie rod ends above said upper end cap.

11. A filter housing according to claim 10 wherein:

said lower housing part includes an upwardly opening coupling socket in each said aperture for removably receiving the base end of a filter cartridge; and said upper housing portion includes clamp means at the upper end of said inlet chamber for engaging the upper end of each filter cartridge mounted in the filter to retain the cartridge in its respective coupling socket when said housing portions are disposed in assembled relation.

12. A filter housing according to claim 7 wherein:

said lower housing part includes an upwardly opening coupling socket in each said aperture for removably receiving the base end of a filter cartridge; and said upper housing portion includes clamp means at the upper end of said inlet chamber for engaging the upper end of each filter cartridge mounted in the filter to retain the cartridge in its respective coupling socket when said housing portions are disposed in assembled relation.

* * * * *